(12) United States Patent  
Vronay

(10) Patent No.: US 8,269,734 B2
(45) Date of Patent: Sep. 18, 2012

(54) NON-LINGUISTIC INTERACTION WITH COMPUTER SYSTEMS VIA SURFACE STIMULATION

(75) Inventor: David Patrick Vronay, Beijing (CN)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 12/406,967

(22) Filed: Mar. 19, 2009

(65) Prior Publication Data

US 2010/0238124 A1  Sep. 23, 2010

(51) Int. Cl.
*G06F 3/041* (2006.01)

(52) U.S. Cl. .................. 345/173; 345/661; 345/672

(58) Field of Classification Search .................. None
See application file for complete search history.

(56) References Cited

U.S. PATENT DOCUMENTS

| 5,165,897 | A | 11/1992 | Johnson |
| 5,492,132 | A | 2/1996 | Weinstein et al. |
| 8,036,898 | B2* | 10/2011 | Sato et al. ............... 704/270 |
| 2004/0140993 | A1 | 7/2004 | Geaghan et al. |
| 2004/0152052 | A1 | 8/2004 | Evans, Jr. |
| 2006/0187212 | A1 | 8/2006 | Park et al. |
| 2007/0191913 | A1 | 8/2007 | Kim et al. |
| 2008/0297487 | A1 | 12/2008 | Hotelling et al. |
| 2010/0220063 | A1* | 9/2010 | Fei ........................... 345/173 |

FOREIGN PATENT DOCUMENTS

| WO | 2006081883 A2 | 8/2006 |
| WO | 2008084208 A2 | 7/2008 |

OTHER PUBLICATIONS

"Archive for the 'haptic' Category", retrieved at<<http://architectradure.wordpress.com/category/haptic/>>, Mar. 5, 2007, pp. 1-16.

* cited by examiner

*Primary Examiner* — Muhammad N Edun
(74) *Attorney, Agent, or Firm* — Hope Baldauff Hartmann, LLC

(57) ABSTRACT

Tools and techniques for non-linguistic interaction with computer systems via surface stimulation are provided. These tools may receive indications of stimulation levels calculated for cells defined by a non-linguistic user interface. The cells may be associated with respective physical regions of a hardware substrate. The stimulation levels may be calculated based on non-linguistic actions directed by users to the hardware substrate. Visible characteristics of the non-linguistic user interface may be updated in response to the calculated stimulation levels.

20 Claims, 7 Drawing Sheets

NON-LINGUISTIC INTERACTION WITH COMPUTER SYSTEMS VIA SURFACE STIMULATION

BACKGROUND

Traditionally, users have interacted with computing systems through linguistic interfaces. For example, users may learn programming languages, which provide a form of linguistic communication that is "understandable" by both humans and computing systems. In other examples, users may interact with computing systems through application software. However, such application software typically presents a user interface organized by linguistic features, such as commands in the form of nouns or verbs that are organized into hierarchical menu systems.

SUMMARY

Tools and techniques for non-linguistic interaction with computer systems via surface stimulation are provided. These tools may receive indications of stimulation levels calculated for cells defined by a non-linguistic user interface. The cells may be associated with respective physical regions of a hardware substrate. The stimulation levels may be calculated based on non-linguistic actions directed by users to the hardware substrate. Visible characteristics of the non-linguistic user interface may be updated in response to the calculated stimulation levels.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
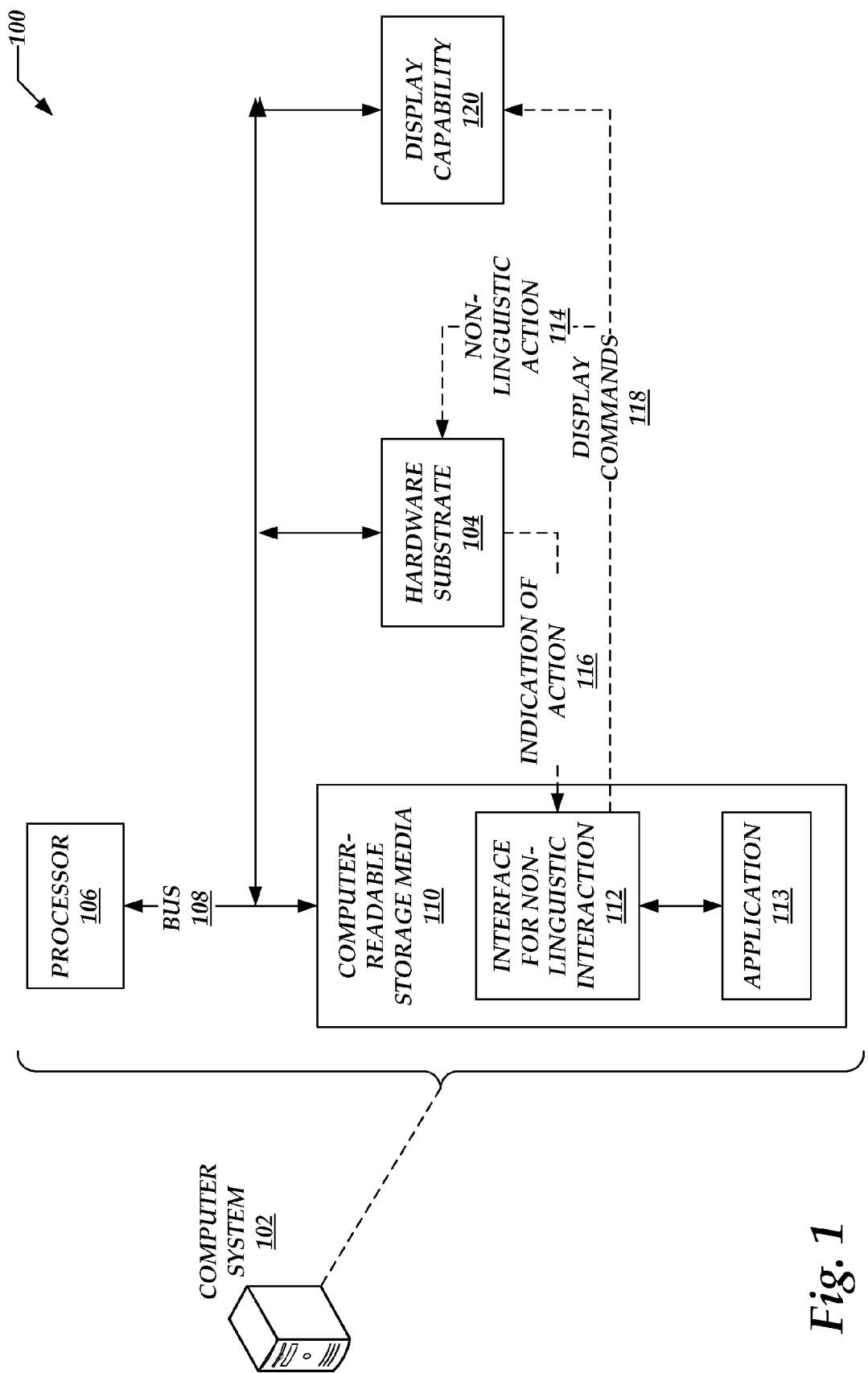
FIG. 1 is a combined block and flow diagram illustrating systems or operating environments suitable for non-linguistic interaction with computer systems via surface stimulation.

The following detailed description provides tools and techniques for non-linguistic interaction with computer systems via surface stimulation. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques related to non-linguistic interaction with computer systems via surface stimulation.

FIG. 1 illustrates systems or operating environments, denoted generally at 100, related to non-linguistic interaction with computer systems via surface stimulation. Turning to FIG. 1 in more detail, these systems 100 may support any number of computer systems, with FIG. 1 illustrating an example computer system or computer-based system at 102 (collectively, computer systems 102). It is noted that the graphical representation of the computer system 102 is chosen only for convenience in presenting this description, but not to limit possible implementations of this description. For example, the computer system 102 may represent surface computers, desktop computing systems, mobile communication devices, smartphones/wireless personal digital assistants (PDAs), digital picture frames, and the like.

Examples of the computer systems 102 may include any processor-based computing systems that interact with users via non-linguistic interfaces. For example, these users may interact with the computer systems 102 by touching a hardware substrate 104 in some predefined manner, as distinguished from interactions involving linguistic or verbal techniques. Illustrative, but non-limiting, applications of the computer systems 102 may include photo sharing, media editing, communications, mapping and navigation applications, and the like. Without limiting possible implementations, the computer systems 102 may be characterized as using "surface computing" techniques.

Turning to the computing systems 102 in more detail, these systems may include one or more instances of processing hardware, with FIG. 1 providing a processor 106 as an example of such processing hardware. The processors 106 may have a particular type or architecture, chosen as appropriate for particular implementations. In addition, the processors 106 may couple to one or more bus systems 108, having type and/or architecture that is chosen for compatibility with the processors 106.

The computer systems 102 may also include one or more instances of a physical computer-readable storage medium or media 110, which couple to the bus systems 108. The bus systems 108 may enable the processors 106 to read code and/or data to/from the computer-readable storage media 110. The media 110 may represent apparatus in the form of storage elements that are implemented using any suitable technology, including but not limited to semiconductors, magnetic materials, optics, or the like. The media 110 may represent memory components, whether characterized as RAM, ROM, flash, or other types of technology. The media 110 may also represent secondary storage, whether implemented as hard drives or otherwise. Hard drive implementations may be characterized as solid state, or may include rotating media storing magnetically-encoded information.

The storage media 110 may include one or more modules of software instructions that, when loaded into the processor 106 and executed, cause the computer systems 102 to facilitate non-linguistic interaction with users via surface stimulation. As detailed throughout this description, these modules of instructions may also provide various tools or techniques by which the computing systems 102 may participate within the overall systems or operating environments 100 using the components, flows, and data structures discussed in more detail throughout this description. For example, the storage media 110 may include one or more software modules that implement interfaces 112 that facilitate non-linguistic interaction between the computer system 102 and any number of users.

In general, the software modules providing the interfaces 112 may, when loaded into the processors 106 and executed, transform the processors 106 and the overall computer systems 102 from general-purpose computing systems into special-purpose computing systems customized to facilitate non-linguistic interaction with computer systems via surface stimulation. The processors 106 may be constructed from any number of transistors or other discrete circuit elements, which may individually or collectively assume any number of states. More specifically, the processor 106 may operate as a finite-state machine, in response to executable instructions contained within the software modules providing the interfaces 112. These computer-executable instructions may transform the processors 106 by specifying how the processors 106 transition between states, thereby transforming the transistors or other discrete hardware elements constituting the processors 106.

Encoding the software modules providing the interfaces 112 may also transform the physical structure of the storage media 110. The specific transformation of physical structure may depend on various factors, in different implementations of this description. Examples of such factors may include, but are not limited to: the technology used to implement the storage media 110, whether the storage media 110 are characterized as primary or secondary storage, and the like. For example, if the storage media 110 are implemented as semiconductor-based memory, the software implementing the interfaces 112 may transform the physical state of the semiconductor memory, when the software is encoded therein. For example, the software may transform the state of transistors, capacitors, or other discrete circuit elements constituting the semiconductor memory.

As another example, the storage media 110 may be implemented using magnetic or optical technology. In such implementations, the software implementing the interfaces 112 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The storage media 110 may also include one or more instances of application software 113, with FIG. 1 representing communication between the interfaces 112 and the applications 113 by the bidirectional arrow connecting blocks 112 and 113. As described in further detail below, examples of the applications 113 may include applications related to: editing or creating media or multimedia (e.g., audio/video content, images, and the like); editing or sharing photographs; navigating, exploring, or mapping geographic areas of interest; creating reading cards for loved ones; and the like.

In general, the tools and techniques described herein may be suitable for cooperating with applications 113 that involve some level of emotional interaction with users. More specifically, the interfaces 112 may provide a non-linguistic user interface (UT) that is emotionally transparent, thereby enabling users to experience a broader range of emotional connection with the computer system 102. Comparing, for example, a telephone conversation with an e-mail exchange, the telephone conversation may convey the emotion expressed in a speaker's voice. However, a textual e-mail exchange typically does not convey emotion, without additional information or context provided by an author of the e-mail (e.g., particular codes, emoticons, and the like). The telephone conversation may be characterized as an emotionally transparent communication mode, while the e-mail exchange may be characterized as an emotionally neutralizing communication mode.

The software providing the interfaces 112 may cooperate with the hardware substrate 104. Turning to the hardware substrate 104 in more detail, it may operate using any number of different technologies. For example, the hardware substrate 104 may include a touch-sensitive surface, operative to output signals indicating where and how a given user has physically interacted with the hardware substrate 104. In other examples, the hardware substrate 104 may include one or more cameras that are operative to capture representations of physical interactions with users. These cameras may be combined with image or video processing technology, adapted as appropriate to process these representations of physical interactions, to determine where and how a given user has "touched" the hardware substrate 104. However, the foregoing examples are provided only for the sake of illustration, and implementations of this description may include other technologies for the hardware substrate 104 without departing from the scope and spirit of this description.

In general, the hardware substrate 104 may operate using any technologies suitable for detecting touch input from users. Examples of such technologies may include optical systems that incorporate cameras and/or other optical components. Other technologies may include sonar-based systems, laser or light-beam based systems, systems based on capacitive sensors, and the like.

It is noted that the hardware substrate 104 may or may not be planar. For example, some implementations of the hardware substrate 104 may be relatively flat. However, other implementations of the hardware substrate 104 may include curved surfaces, or may include other more complex surface features or characteristics.

In general, FIG. 1 represents non-linguistic actions at 114, as directed to and detected by the hardware substrate 104. In turn, the hardware substrate 104 may process these non-linguistic actions 114, and output representations or indications 116 of these non-linguistic actions 114. As indicated in FIG. 1, the interface 112 may receive the indications 116, process them as described herein, and output display commands 118 in response to the non-linguistic actions 114.

The computer systems 102 may provide some type of hardware with display and feedback capability, represented generally as display 120. However, this hardware may or may not be display hardware, and feedback as described herein may include visible feedback, aural feedback, tactile/haptic feedback, other types of feedback (e.g., smell), or any combination of feedback types provided via any number of output modalities. Thus, the feedback provided to users may include, but is not limited to, pixels displayed visibly on a screen, holographic images projected into suitable mediums (e.g., air, water, etc.), tactile feedback sensible by users through appropriate hardware (e.g., devices operating on principles similar to those employed by devices marketed under the trademark PINPRESSIONS™).

In general, the display 120 may receive the display commands 118, and respond to these display commands to present feedback to users of the computer systems 102. More specifically, the display and feedback capability 120 may be overlaid onto the hardware substrate 104, or may be integrated into the hardware substrate 104. However, it is noted that an area providing display and feedback may or may not be coplanar with the hardware substrate 104. For example, holographic displays provided as part of the feedback may be oriented in any manner, relative to the hardware substrate 104. In another example, the description herein may be implemented in a laptop computing system that includes a display screen, in which the hardware substrate 104 is a touch-sensitive pad that is separate from the display screen.

In example implementations, the computer system 102 may support applications that enable users to share or organize photos or other types of media or multimedia. For example, the computer system 102 may detect when a given user has placed his or her digital camera on the hardware substrate 104. In turn, the computer system 102 may retrieve any photographs from the digital camera, and present visual representations of these photographs on the display 120. These visual representations may include, for example, thumbnail representations of these photographs.

Once the thumbnail representations of the photographs are presented on the display 120, the computer system 102 may enable a given user to manipulate the photographs by interacting with these thumbnail representations. In some implementation scenarios, the computer system 102 may enable the user to organize the photographs by interacting with the thumbnail representations of the photographs, as presented on the display 120. For example, assuming that the display 120 also presents representations of albums or folders suitable for containing the photographs, the user may move photographs into those albums by touching the thumbnail representations of those photographs, and dragging those thumbnails to the representations of the albums.

In the foregoing implementation examples, involving organizing or sharing photos, the non-linguistic actions 114 may represent physical actions taken by the given user, to select and move the thumbnail representations of different photos. In turn, the indications 116 of these actions may characterize or identify physical actions taken by the given user (e.g., touching a thumbnail, sliding the thumbnail along the hardware substrate 104, etc.).

Having provided the foregoing description of the overall systems or operating environments shown in FIG. 1, the discussion now proceeds to a more detailed description of the non-linguistic interface 112. This more detailed description is now provided with FIG. 2.

Figure 2:
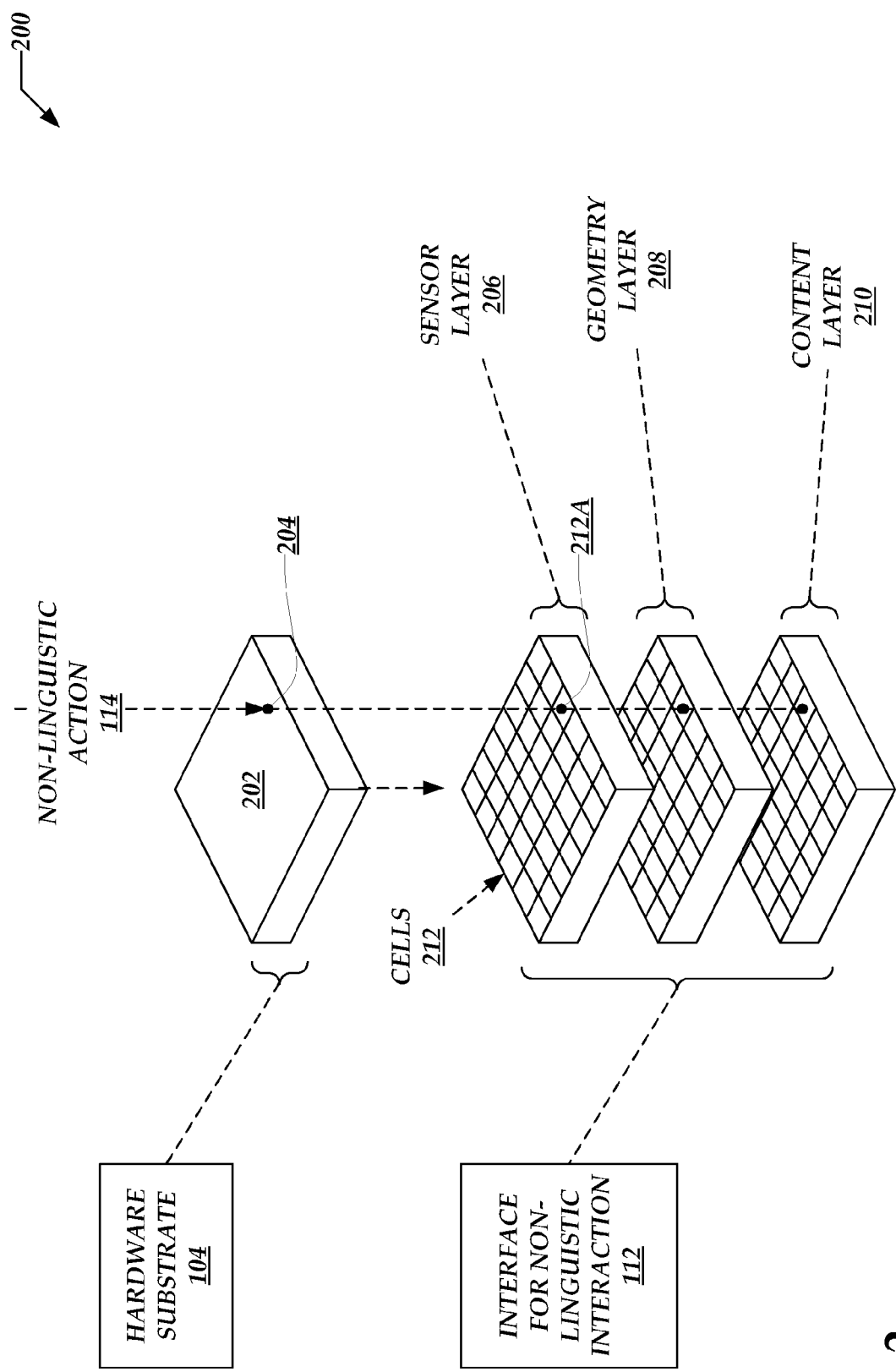
FIG. 2 is a block diagram illustrating additional features of a hardware substrate and interface for non-linguistic interaction, as shown in FIG. 1.

FIG. 2 illustrates additional features, denoted generally at 200, of the hardware substrate 104 and the non-linguistic interface 112, as carried forward from FIG. 1. Referring to the hardware substrate 104, FIG. 2 provides an example physical configuration of the hardware substrate, as denoted at 202. However, it is noted that this example physical configuration 202 does not limit possible implementations of this description, and that such implementations may include hardware substrates 104 having arbitrary surface configurations, shapes, and/or physical dimensions.

Any number of different users (not shown in FIG. 2) may interact with the hardware substrate 104 by directing physical or non-linguistic actions to any portion or region of the substrate 104. FIG. 2 carries forward an example non-linguistic action 114, directed to an arbitrary portion 204 within the physical configuration 202 of the hardware substrate 104. For example, this non-linguistic action 114 may represent a user touching the substrate 104, sliding a hand or finger along the substrate 104, and the like.

Turning to the interface 112 in more detail, the software providing this interface 112 may define an arbitrary number of layers that are overlaid onto the hardware substrate 104. The example shown in FIG. 2 illustrates three such layers: a sensor layer 206, a geometry layer 208, and a content layer 210. However, implementations of this description may include types and numbers of layers different than those shown in FIG. 2, without departing from the scope and spirit of this description.

The sensor layer 206, geometry layer 208, and content layer 210 are described in further detail in connection with FIGS. 3-5. However, in overview, the sensor layer 206 may correspond to the physical configuration 202 of the hardware substrate 104. More specifically, the sensor layer 206 may define a plurality of different cells 212, which correspond to respective sub-regions or areas of the hardware substrate 104. These cells 212 may be defined to have any convenient size or pitch, as appropriate in different implementations. Accordingly, the representations of the cells 212 as shown in FIG. 2 are understood to be arbitrary and not presented to scale.

As shown in FIG. 2, a specific cell 212a within the sensor layer 206 may correspond to the portion 204 that is affected by the non-linguistic action 114. As described in further detail below, the interface 112 may maintain respective state information associated with different cells 212. In response to the non-linguistic action 114, state information associated with the affected cell 212a may change. In addition, as described in further detail below, state information associated with the geometry layer 208 and the content layer 210 may also change in response to the non-linguistic action 114.

Figure 3:
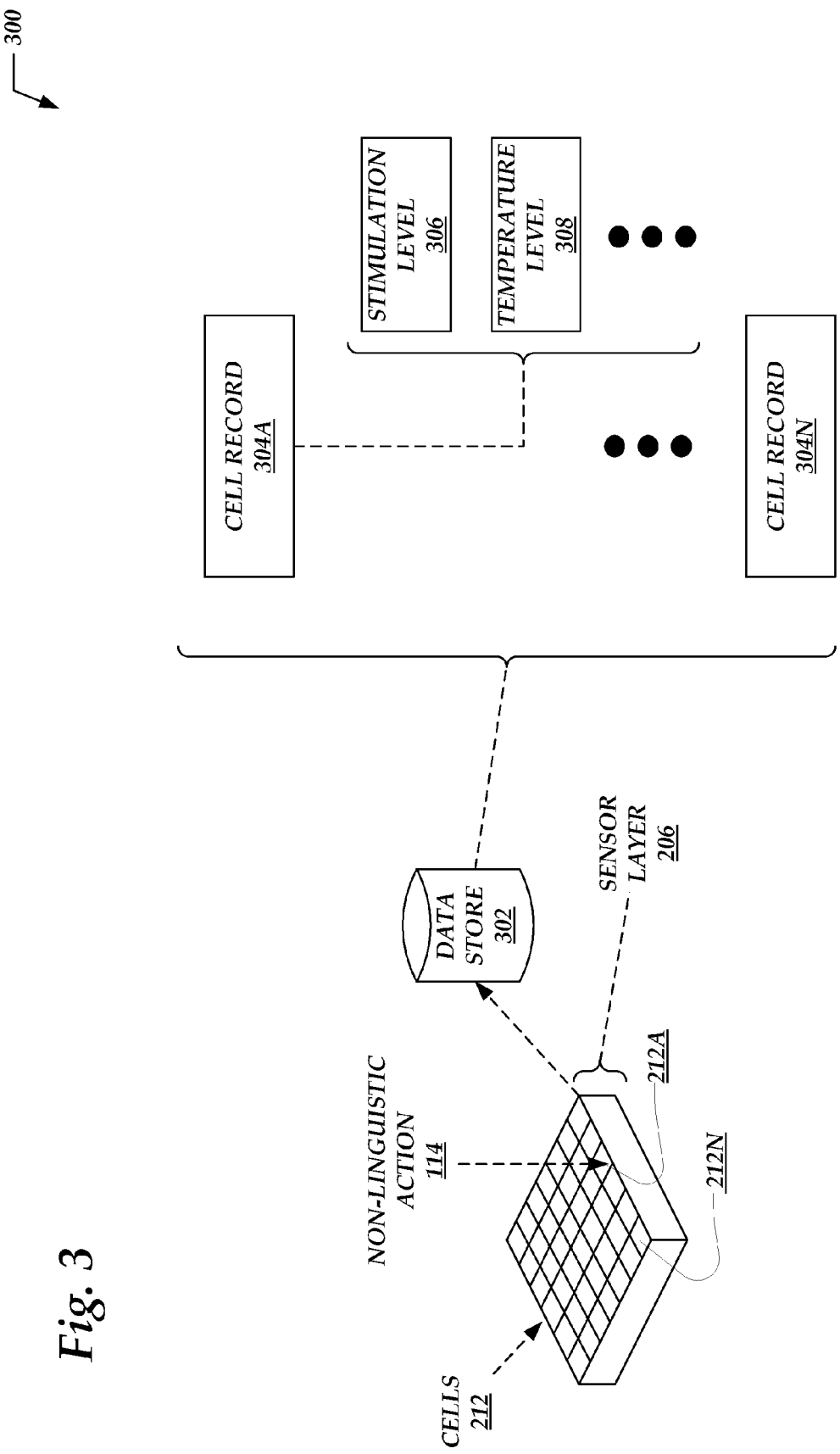
FIG. 3 is a block diagram illustrating additional features of a sensor layer as shown in FIG. 2.

FIG. 3 illustrates additional features, denoted generally at 300, of the sensor layer 206 as shown in FIG. 2. For ease of reference, FIG. 3 also carries forward representations of the cells 212.

As shown in FIG. 3, the sensor layer 206 may be associated with data storage 302, which contains respective entries corresponding to the various cells 212. For example, the data storage 302 may include cell records 304a and 304n (collectively cell records 304), associated respectively with arbitrary cells 212a and 212n maintained by the sensor layer 206. In turn, the cell records 304 may store information indicating a stimulation level 306 and a temperature level 308 as associated with different cells 212.

Turning to the stimulation levels 306 in more detail, the sensor layer 206 may update the stimulation levels 306 for any cells 212 affected by the non-linguistic action 114. The stimulation levels 306 may change in response to the type and nature of the non-linguistic action 114. For example, a relatively brief touch affecting a given cell 212 may result in a relatively low stimulation level 306 for that given cell 212. However, repeated touching over a longer duration (e.g., rubbing or stroking) may result in an increased stimulation level 306 for that given cell 212.

In addition to the foregoing examples, the stimulation level 306 may be calculated based upon a number of discrete actions or touches occurring per unit time (e.g., how many fingers touching the hardware substrate and for how long, per unit time). In addition, the stimulation level 306 may be calculated based on linear movement along the hardware substrate, occurring per unit time.

Turning to the temperature levels 308 in more detail, the sensor layer 206 may update the temperature levels 308 for any cells 212 affected by the non-linguistic action 114. More specifically, the temperature levels 308 computed for the affected cells 212 may vary, depending on the duration or dwell time of the non-linguistic action 114. In some implementations, the actual temperature levels of particular regions of the hardware substrate may be measured. In general, implementations of this description may include a temperature-sensing subsystem and a touch-sensing subsystem.

In an example scenario, if the user touches a given portion of the hardware substrate 104 for a longer period of time, the temperature level 308 computed for the cells affected by this touch may increase, indicating that the affected cells are "warming up" because of the user's touch. In addition, when the user stops touching the given portion of the hardware substrate 104, the temperature levels 308 computed for the affected cells may decrease, indicating that the affected cells are cooling down once the user's touch is withdrawn. Put differently, temperature and/or stimulation levels may be recalculated in response to reduction, decrease, or cessation of actions previously performed by users.

In some implementation scenarios, when the stimulation levels 306 and/or the temperature levels 308 calculated for one or more given cells reach or exceed predefined thresholds, these calculated stimulation levels and/or temperature levels 308 may be propagated to neighboring cells. In this manner, when the stimulation levels 306 and/or temperature levels 308 become sufficiently strong, they may gain increasing influence over neighboring cells.

Figure 4:
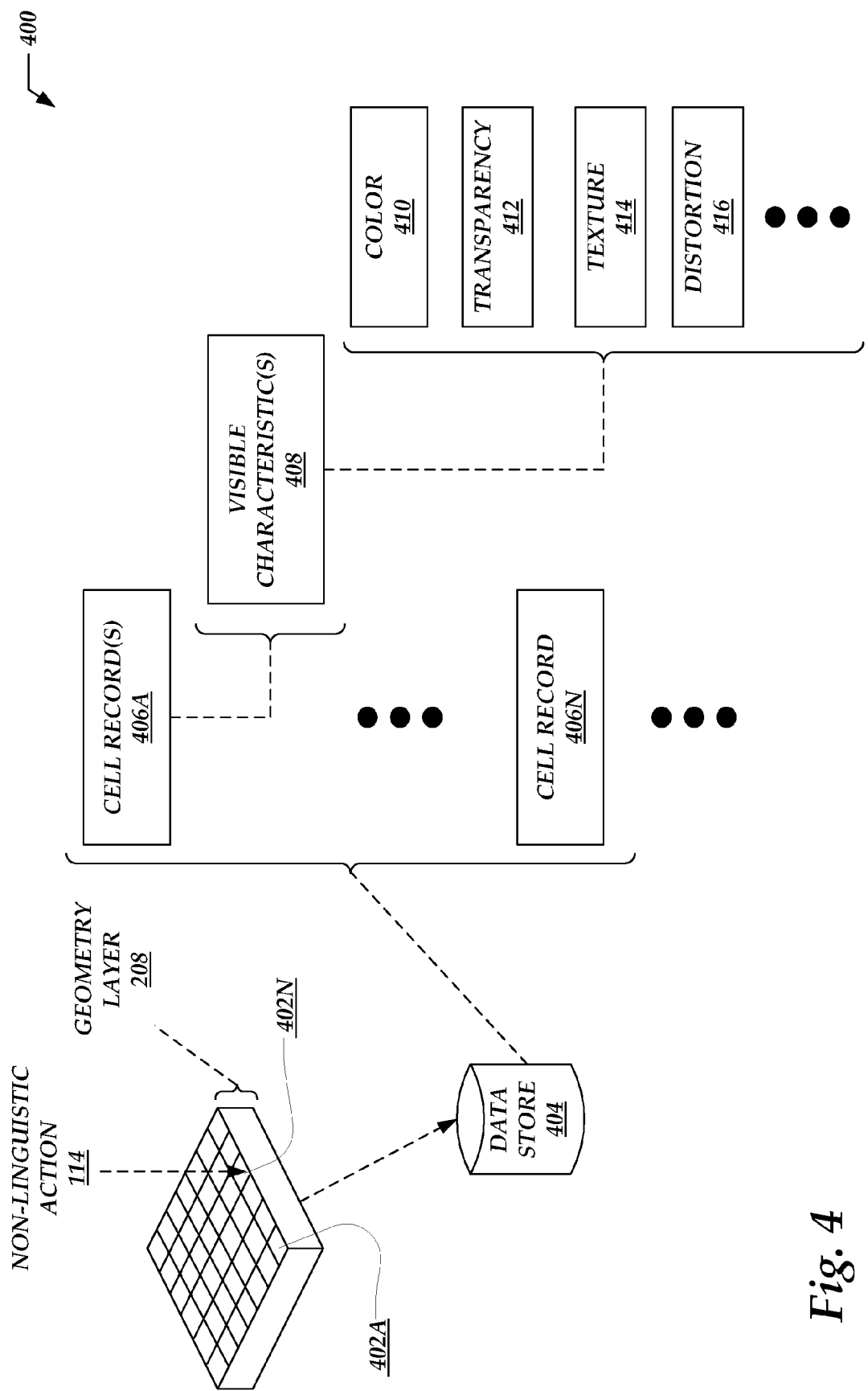
FIG. 4 is a block diagram illustrating additional features of a geometry layer as shown in FIG. 2.

FIG. 4 illustrates additional features, denoted generally at 400, of the geometry layer 208 as shown in FIG. 2. As shown in FIG. 4, the geometry layer 208 may define cells 402a and 402n (collectively, cells 402) that correspond generally to the cells 212a and 212n defined by the sensor layer 206, as shown in FIGS. 2 and 3. In addition, the geometry layer 208 may maintain a data store 404 that maintains respective records 406a and 406n (collectively, cell records 406) corresponding to the cells 402a and 402n.

These cell records 406 may contain information indicating visible characteristics of the cells 402, with FIG. 4 denoting these visible characteristics generally at 408. Examples of these visible characteristics 408 may include color (as denoted at 410), transparency (as denoted at 412), texture (as denoted at 414), distortion or visibility levels (as denoted at 416), and the like. However, the foregoing visible characteristics 408 are shown as example communications channels having properties that are associated with a given output device. Implementations of this description may incorporate any number of different output devices that provide feedback using different output modalities. Accordingly, different output devices may communicate stimulation levels via different communication channels, and the particulars of the characteristics 408 may vary, depending on the capabilities of the output devices included in different given implementations.

For example, an audio device may include channels, such as different voices or frequencies used to provide output, loudness levels, and the like.

In general, the cells 402 within the geometry layer 208 may respond to the state of the cells 212 within the sensor layer 208. Within the sensor layer 206, for example, as the stimulation level 306 or the temperature level 308 of one or more given cells 212 increases, the geometry layer 208 may adjust the visible characteristics 408.

Figure 5:
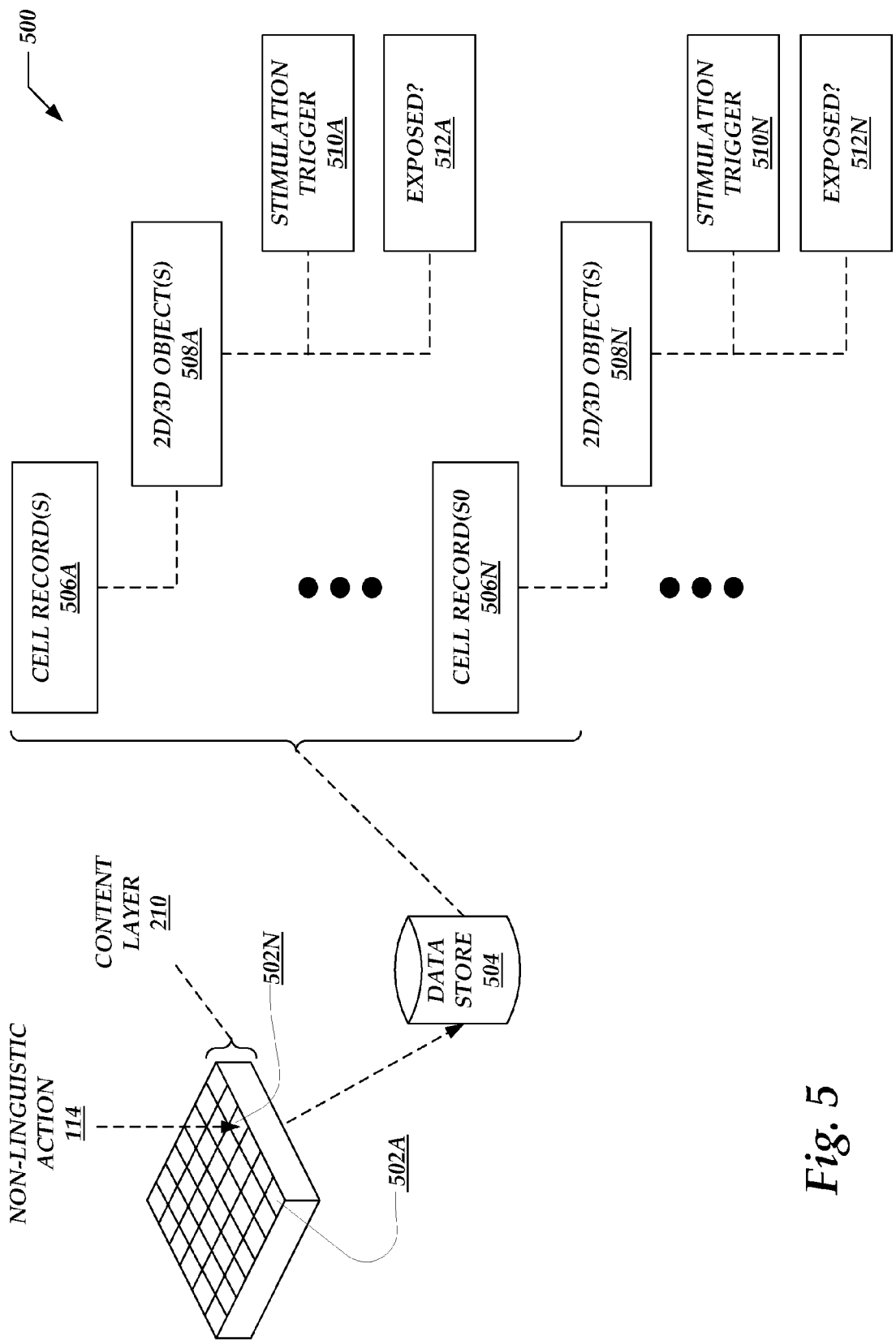
FIG. 5 is a block diagram illustrating additional features of a content layer as shown in FIG. 2.

FIG. 5 illustrates additional features, denoted generally at 500, of the content layer 210 as shown in FIG. 2. As shown in FIG. 5, the content layer 210 may define cells 502a and 502n (collectively, cells 502) that correspond respectively to the cells 212a and 212n defined by the sensor layer 206, as shown in FIGS. 2 and 3. The cells 502a and 502n may also correspond respectively to the cells 402a and 402n defined by the geometry layer 208, as shown in FIG. 4. In addition, the content layer 210 may maintain a data store 504 that maintains respective records 506a and 506n (collectively, cell records 506) corresponding to the cells 502a and 502n.

In general, these cell records 506 may define representations of objects that may become visible to the user through the display 120, assuming that the user interacts appropriately with the hardware substrate 104. FIG. 5 provides examples of objects 508a, as defined by the cell records 506a, and examples of objects 508n, as defined by the cell records 506n. The objects 508a and 508n (collectively, objects 508) may be characterized as two-dimensional (2-D) or three-dimensional (3-D). In example implementations, the objects 508 may represent graphics, icons, tools, or other items provided by a user interface (UI) presented on a display 120. These objects 508 may be responsive to user activation or manipulation to initiate particular functions.

In example implementations, if the user directs one or more predefined non-linguistic actions 114 to the hardware substrate 104, this action may affect one or more of the cells 212 in the sensor layer 206, as shown in FIG. 2. In turn, changes to the cells 212 may affect the visible characteristics (e.g., 408 in FIG. 4) of the corresponding cells 402 defined by the geometry layer 208. If the visible characteristics 408 within the geometry layer 208 reach some threshold or trigger values, then the representations of the objects 508 may become visible to the user through the display 120.

To facilitate the foregoing functions, the data store 504 may associate stimulation triggers 510a and 510n (collectively, stimulation triggers 510) respectively with any defined objects 508a and 508n. More specifically, the defined objects 508a and 508n may be located respectfully in one or more cells 502a and 502n. In turn, the cells 502a and 502n may be associated with cells 212a and 212n in the sensor layer 206. Finally, the sensor layer 206 may maintain stimulation levels 306 associated with the cells 212a and 212n. When these stimulation levels 306 reach or exceed any applicable stimulation triggers 510a or 510n, the objects 508a and 508n may be exposed to the users for viewing through the display 120. When these stimulation levels 306 fall below any applicable stimulation triggers 510a or 510n, the objects 508a and 508n may be concealed from the users.

To indicate whether a given object 508a and 508n is exposed at a given time, the cell records 506a and 506n, as maintained by the data store 508, may associate records 512a and 512n respectively with those objects 508a and 508n. More specifically, the records 512a and 512n (collectively, records 512) may indicate whether the associated objects 508a and 508n are visible at that given time, based on the current stimulation levels of the cells corresponding to those objects as compared to the applicable stimulation triggers 510a and 510n.

Figure 6:
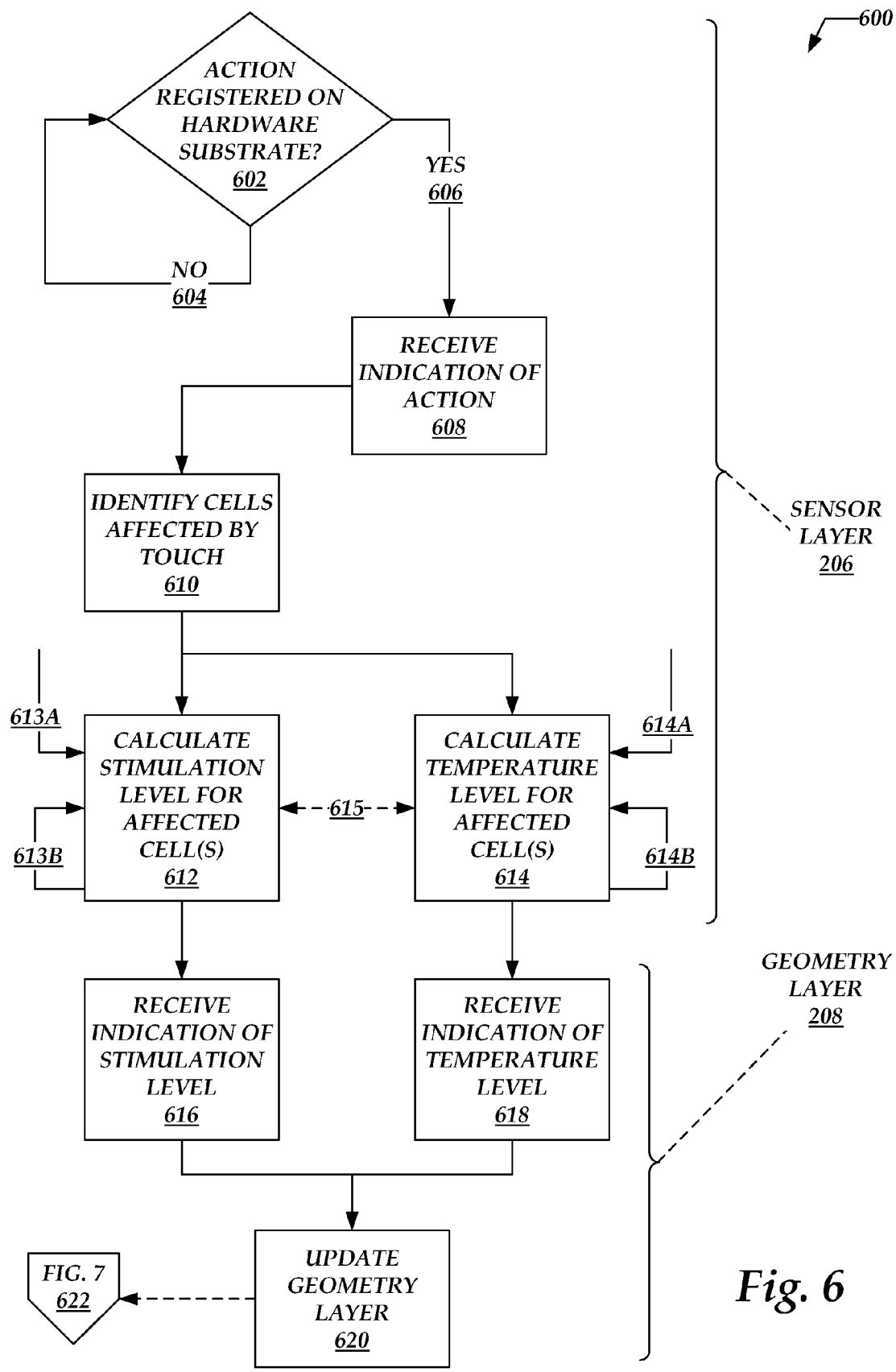
FIG. 6 is a flow chart illustrating process flows that may be performed in connection with non-linguistic interaction with computer systems via surface stimulation.
Figure 7:
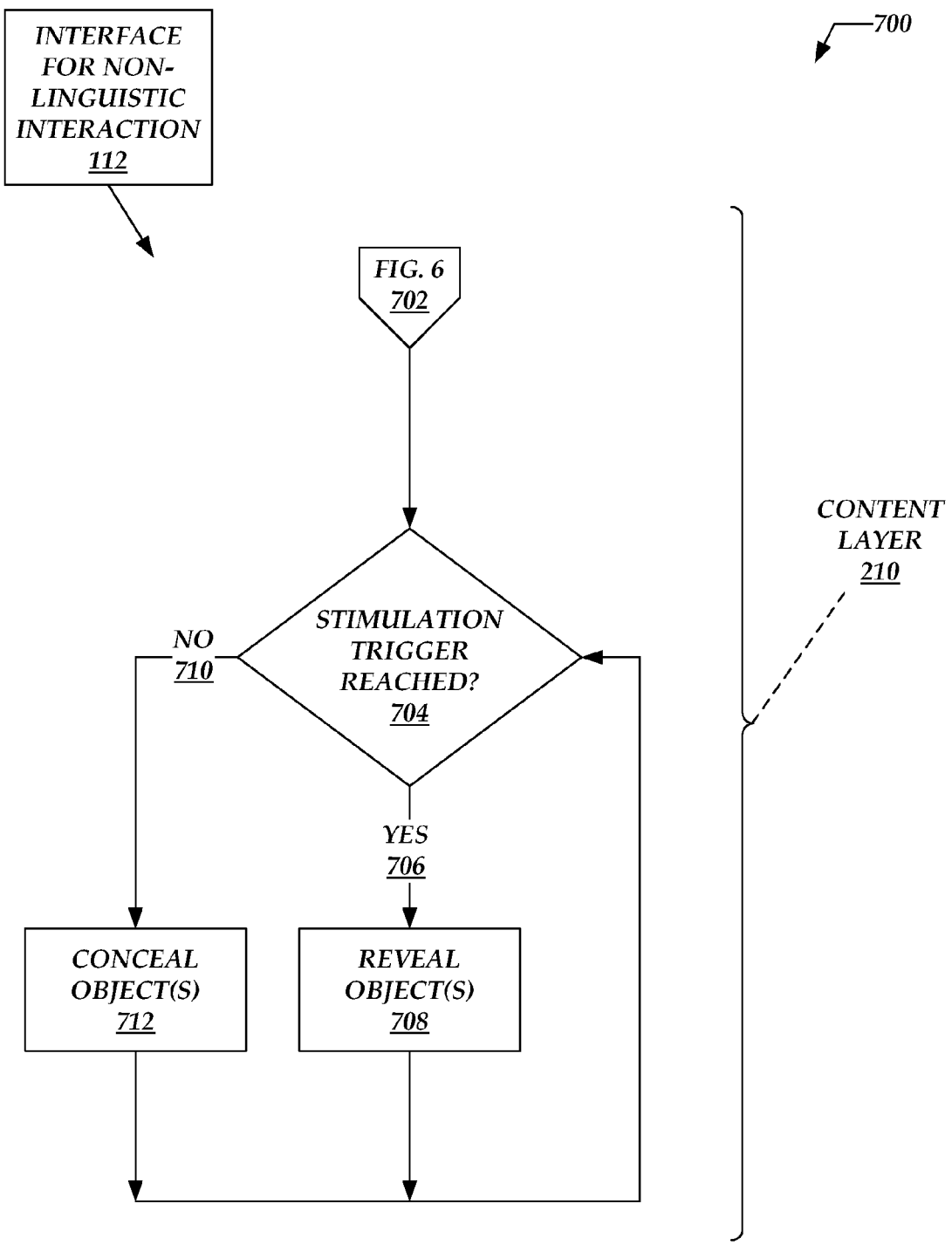
FIG. 7 is a flow chart illustrating additional process flows that may be performed in connection with non-linguistic interaction with computer systems via surface stimulation.

FIG. 6 and 7 illustrate process flows, denoted generally at 600 and 700, that may be performed in connection with non-linguistic interaction with computer systems via surface stimulation. Although the process flows 600 and 700 are described in connection with the interface for non-linguistic interaction 112, it is noted that implementations of the process flows 600 and 700 may be performed, at least in part, with other components without departing from the scope and spirit of this description.

For the sake of consistency with the foregoing description of the sensor layer 206, the geometry layer 208, and the content layer 210, FIGS. 6 and 7 present the process flows 600 and 700 as associated with the different layers 206-210. However, implementations of the process flows 600 and 700 may operate with different layers other than those described herein, or may operate without reference to the layers described herein.

Turning to the process flows 600 in detail, decision block 602 represents determining whether a non-linguistic action (e.g., a touch or other physical action) has been registered on a hardware substrate. FIG. 1 provides an example of a hardware substrate at 104. So long as the hardware substrate remains relatively idle (i.e., without providing any indication of non-linguistic action), the process flows 600 may take No branch 604 and loop as indicated at block 602.

Once decision block 602 detects an indication of non-linguistic action directed to the hardware substrate, the process flows 600 may take Yes branch 606 to block 608. Block 608 represents receiving an indication of the non-linguistic action registered in block 602. The nature and content of the indication received in block 608 may depend on the capabilities of a particular hardware substrate. However, in some implementations, the indication received in block 608 may identify a region within the hardware substrate affected by the non-linguistic action, and may identify a duration or character associated with the non-linguistic action. For example, the indication received in block 608 may specify whether the non-linguistic action included lateral movement while touching the hardware substrate.

In addition to the foregoing examples, block 608 may include receiving an indication of whether the user has contacted the hardware substrate with an entire hand, or only with one or more fingertips. Block 608 may also include receiving an indication of an orientation of an object (e.g., the user's hand) contacting the hardware substrate.

Block 610 represents identifying one or more cells affected by the non-linguistic action directed to the hardware substrate. FIG. 2 provides examples of such cells at 212. Depending on the nature of a given non-linguistic action, one or more of the cells may be affected by this action. For example, if a given user taps a relatively small area of the hardware substrate, this type of action may be expected to affect relatively few of the cells. However, if the given user sweeps his or her hand across a relatively large area of the hardware substrate, this type of action may be expected to affect relatively more of these cells.

Block 612 represents calculating a stimulation level for the cells affected by the non-linguistic action. FIG. 3 provides examples of stimulation levels at 306, which may be stored in the cell records 304 that the sensor layer 206 maintains.

Block 614 represents calculating a temperature level for the cells affected by the non-linguistic action. FIG. 3 provides examples of temperature levels at 308, which may be stored in the cell records 304 that the sensor layer 206 maintains.

Blocks 612 and 614 may include calculating stimulation levels and temperature levels based on the application (e.g., 113 in FIG. 1) with which a given user is interacting. Different applications 113 may respond favorably or unfavorably to different types of non-linguistic actions by users. For example, some applications may respond favorably to a poke or other abrupt contact directed by the user to the hardware substrate, while other applications may not respond favorably to such contact. As another example, some applications may respond favorably to a more gentle motion (e.g., a petting or rubbing motion).

As shown in FIG. 6, blocks 612 and 614 may include calculating the stimulation and/or temperature levels for a given cell depending on several different factors. For example, user actions directed to the given cell may affect the stimulation level calculated for that cell. In addition, the stimulation and/or temperature level calculated for that given cell may depend on the stimulation and/or temperature levels of neighboring cells. From the perspective of that given cell, the stimulation levels of neighboring cells are denoted at 613a, and the temperature levels of neighboring cells are denoted at 614a.

In addition, blocks 612 and 614 may include calculating the stimulation and/or temperature levels for a given cell depending on the previous stimulation and/or temperature levels of that given cell, as denoted at 613b and 614b. Thus, the calculations of the stimulation and/or temperature levels may involve some degree of recursion, with previous stimulation and/or temperature levels being fed-back into the calculation of a current stimulation and/or temperature level.

As represented at 615, block 612 may include calculating stimulation levels for a given cell based on the temperature levels calculated for that cell. Similarly, block 614 may include calculating temperature levels for that cell based on the stimulation levels.

As indicated in FIG. 6, processing blocks 602-614 may be performed by the sensor layer 206, in some implementations. The geometry layer 608 may perform the process flows 600 and 700, beginning at blocks 616 and 618.

Block 616 represents receiving an indication of the stimulation level, as calculated in block 612 for any cells 212 within the sensor layer 206 affected by the non-linguistic action directed to the hardware substrate. As described above, the geometry layer 208 may define cells (e.g., 402 in FIG. 4) that correspond to the cells 202 in the sensor layer 206. Accordingly, block 616 may include associating the stimulation level calculated for the cells 202 in the sensor layer 206 with corresponding cells 402 within the geometry layer 208.

Block 618 represents receiving an indication of the temperature level, as calculated in block 614 for any cells 212 within the sensor layer 206 affected by the non-linguistic action directed to the hardware substrate. More specifically, block 616 may include associating the temperature level calculated for the cells 202 in the sensor layer 206 with corresponding cells 402 within the geometry layer 208.

Block 620 represents updating the geometry layer 208 in response to the stimulation level and/or temperature level associated with particular cells 402 within the geometry layer 208. For example, block 620 may include adjusting visible characteristics of the geometry layer 208. FIG. 4 illustrates examples of the visible characteristics at 408, including not limited to the examples shown at 410-416.

For clarity of illustration, but not to limit possible implementations, the description of the process flows 600 in FIG. 6 proceed to FIG. 7, via off-page reference 622. The description of FIG. 7 begins at off-page reference 702.

Decision block 704 represents evaluating whether one or more stimulation triggers associated with various objects (e.g., 508*a* and 508*n* in FIG. 5) have been reached. For example, block 704 may include evaluating the stimulation levels calculated and/or received for cells associated with the various objects defined by the content layer 210, and comparing these stimulation levels to any stimulation triggers applicable to the objects. FIG. 5 provides examples of stimulation triggers 510*a* and 510*n*, as associated with respective objects 508*a* and 508*n*.

From decision block 704, if the stimulation level of the cells associated with a given object meets or exceeds the stimulation trigger applicable to that object, then the process flows 700 may take Yes branch 706 to block 708. Block 708 represents revealing or exposing the object or objects associated with the stimulation trigger reached in block 704. For example, block 708 may include revealing or exposing a given UI object, so that the object is visible on the display 120 provided by the computer system 102. In addition, block 708 may include activating or enabling the object to respond to user input.

Returning to decision block 704, if the stimulation level of the cells associated with a given object do not meet or exceed the stimulation trigger applicable to that object, the process flows 700 may take No branch 710 to block 712. Block 712 represents concealing the given object, so that it is no longer visible on the display 120 of the computer system 102. Block 710 may include concealing the given object relatively quickly, or may include concealing the given object over time so that it fades from view relatively slowly. In different implementation scenarios, block 710 may include concealing the given object after it has been exposed or revealed by block 708. In other implementation scenarios, block 710 may include maintaining the given object in a concealed state.

It is noted that the process flows 600 and 700 shown in FIGS. 6 and 7 may be repeated indefinitely, to process any number of non-linguistic actions directed to a hardware substrate provided by the computer system 102. However, in the interest of clarity, FIGS. 6 and 7 do not explicitly illustrate this repetitive processing.

The foregoing description provides technologies for non-linguistic interaction with computer systems via surface stimulation. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. Apparatus comprising at least one physical computer-readable storage medium having stored thereon computer-executable instructions that, when loaded into processor hardware and executed, transform the processor hardware to perform the following:

receive an indication of at least one non-linguistic action directed by at least one user to a hardware substrate;

identify at least one cell within a plurality of cells defined by a software-implemented non-linguistic user interface, wherein respective ones of the cells are associated with corresponding physical regions of the hardware substrate; and calculate at least a stimulation level associated with at least the one cell, based on characteristics of the non-linguistic action.

2. The apparatus of claim 1, wherein the instructions to receive an indication of at least one non-linguistic action include instructions to receive an indication that the user has physically touched the hardware substrate.

3. The apparatus of claim 1, wherein the instructions to calculate at least a stimulation level include instructions to classify the non-linguistic action based on number of discrete physical actions occurring per unit time.

4. The apparatus of claim 1, wherein the instructions to calculate a least a stimulation level include instructions to classify the non-linguistic action based on linear movement associated with the non-linguistic action occurring per unit time.

5. The apparatus of claim 1, further comprising instructions to associate the calculated stimulation level with the at least one cell.

6. The apparatus of claim 1, further comprising instructions to identify a further plurality of cells affected by the non-linguistic action, and to calculate respective stimulation levels for the further plurality of cells.

7. The apparatus of claim 1, further comprising instructions to associate at least one threshold applicable to at least one stimulation level calculated for the at least one cell.

8. The apparatus of claim 7, further comprising instructions instructions to propagate the stimulation level to a least a further one of the cells, in response to the stimulation level reaching or exceeding the threshold.

9. The apparatus of claim 1, further comprising instructions to calculate a temperature level associated with the at least one cell, based on characteristics of the non-linguistic action.

10. The apparatus of claim 9, wherein the instructions to calculate the temperature level include instructions to calculate the temperature level based on a dwell duration associated with the non-linguistic action.

11. The apparatus of claim 9, further comprising instructions to associate at least one threshold applicable to the temperature level, and further comprising instructions to propagate the calculated temperature level to at least a further one of the cells in response to the calculated temperature level reaching or exceeding the threshold.

12. The apparatus of claim 1, further comprising instructions to detect a cessation of the non-linguistic action, and further comprising instructions to recalculate the stimulation level in response to detecting the cessation.

13. Apparatus comprising at least one physical computer-readable storage medium having stored thereon computer-executable instructions that, when loaded into processor hardware and executed, transform the processor hardware to perform the following:

receive an indication of at least one stimulation level calculated for at least one of a plurality of cells defined by a software-implemented non-linguistic user interface, wherein the cells are associated with respective physical regions of a hardware substrate, wherein the stimulation level is calculated based on at least one non-linguistic action directed to the hardware substrate by at least one user; and update at least one visible characteristic of the non-linguistic user interface in response to the calculated stimulation level.

14. The apparatus of claim 13, further comprising instructions to receive at least one indication of a temperature level calculated for at least one of the plurality of cells, wherein the temperature level is calculated based on a dwell duration associated with the non-linguistic action.

15. The apparatus of claim 14, further comprising instructions to update a visible characteristics of the non-linguistic user interface in response to the calculated temperature level.

16. The apparatus of claim 13, further comprising instructions to define a stimulation trigger applicable to the calculated stimulation level, and further comprising instructions to evaluate whether the calculated stimulation level is at least as great as the stimulation trigger.

17. The apparatus of claim 16, further comprising instructions to reveal at least one visible representation of a user interface device, and further comprising instructions to activate the user interface device in response to the calculated stimulation level reaching or exceeding the stimulation trigger.

18. The apparatus of claim 17, further comprising instructions to reduce visibility of the representation of the user interface device in response to a reduction in the calculated stimulation level.

19. The apparatus of claim 17, further comprising instructions to deactivate the representation of the user interface device in response to a reduction in the calculated stimulation level.

20. A computer-based system comprising:
at least one instance of processing hardware;
at least one bus system coupled to communicate with the processing hardware;
at least one computer-readable storage medium coupled to communicate with the processing hardware via the bus system, wherein the storage medium is encoded with computer-executable instructions that, when loaded into the processing hardware, transform the processing hardware to provide an interface for non-linguistic interaction between the system and at least one user;
at least one hardware substrate coupled to the bus system, wherein the hardware substrate is responsive to non-linguistic action from the user to provide an indication of the non-linguistic action to the interface, and wherein the interface is operative to respond to the non-linguistic action by altering a display presented to the user;
wherein the interface includes a sensor layer that defines a plurality of cells associated with respective regions of the hardware substrate, wherein the sensor layer is responsive to a non-linguistic action affecting at least one of the regions to modify a state of at least one cell corresponding to the affected region;
wherein the interface includes a geometry layer that maintains state information associated with the cells of the sensor layer, wherein the geometry layer is operative to adjust visible characteristics of the interface in response to changes in the state information; and
wherein the interface includes a content layer that maintains at least one representation of at least one user interface device, and is operative to activate the user interface device for user interaction in response to a stimulation trigger calculated based on the state information.

* * * * *